April 24, 1951  J. P. DE HETRE  2,550,045
POWER-DRIVEN PIPE TONGS
Filed Dec. 22, 1945  5 Sheets-Sheet 3
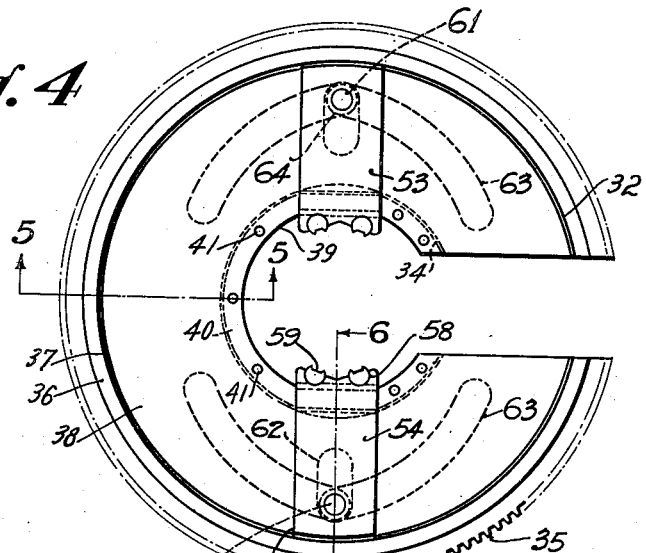
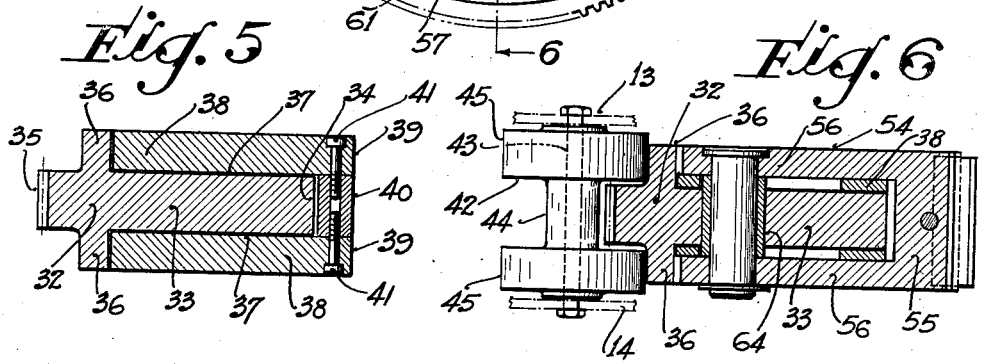
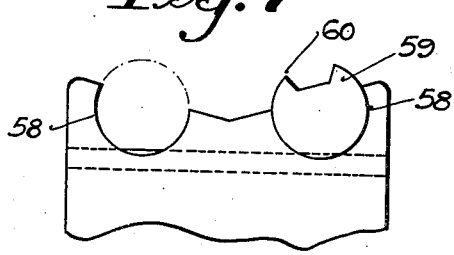
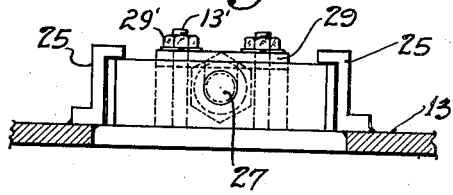
INVENTOR.
JOHN P. DE HETRE
BY James W. Abbott
ATTY.

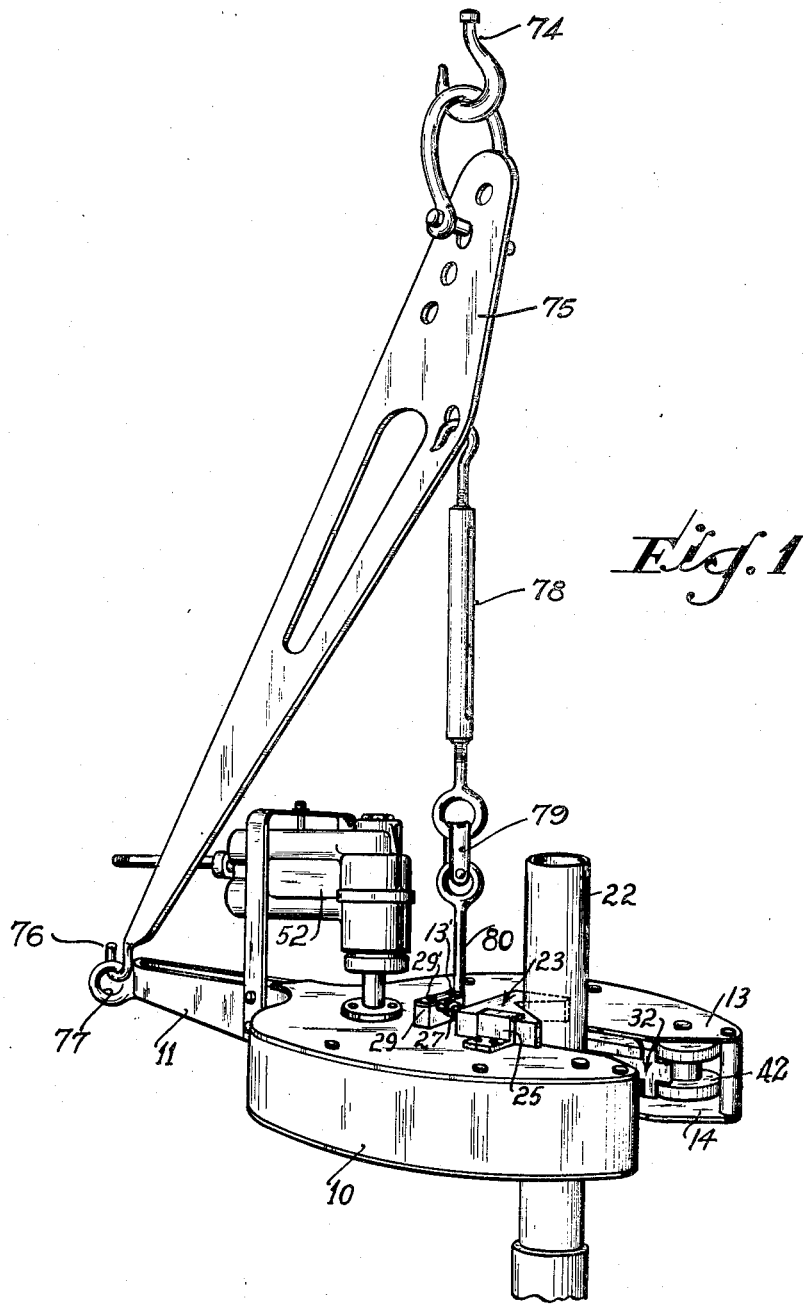

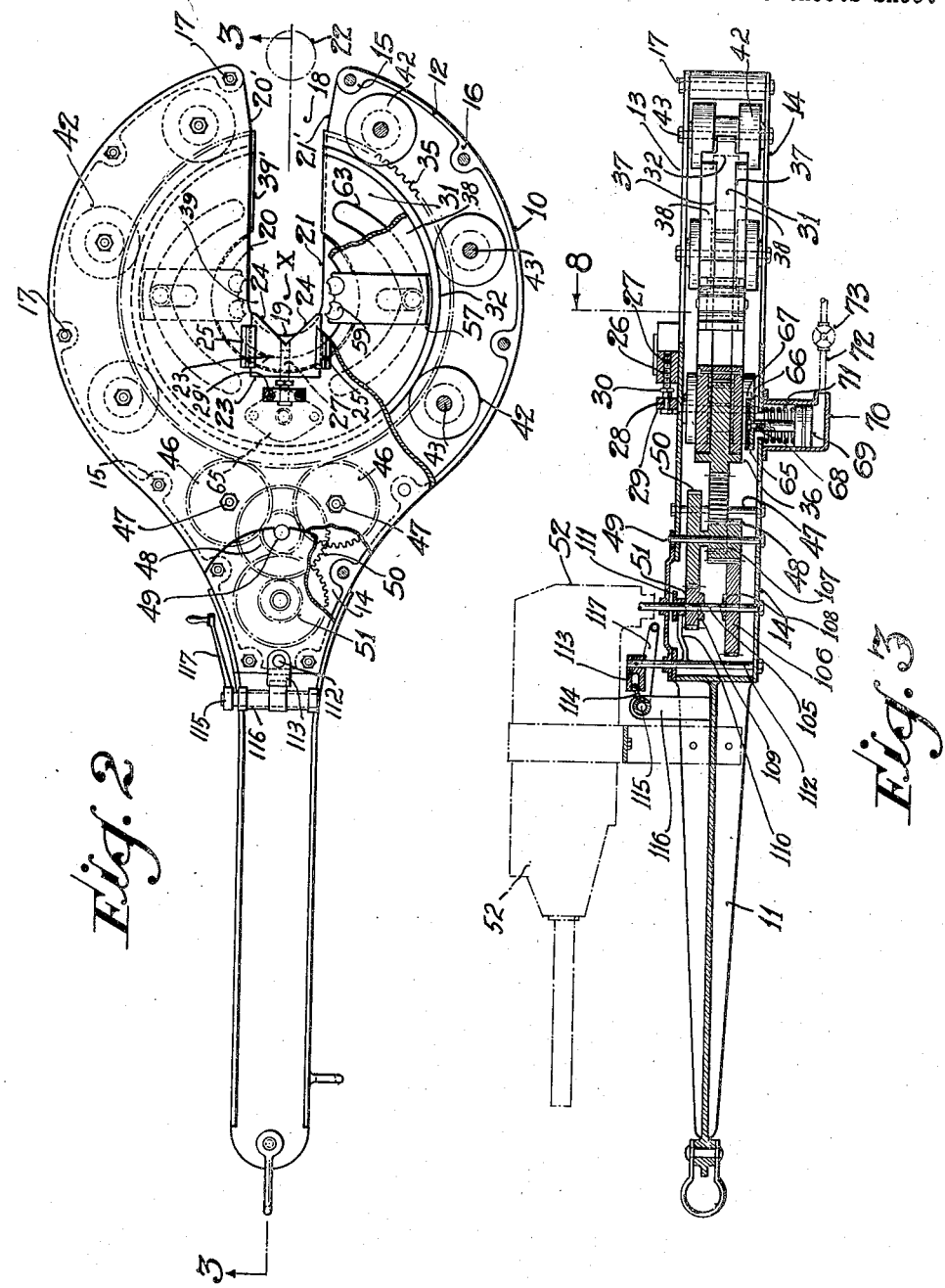

April 24, 1951  J. P. DE HETRE  2,550,045
POWER-DRIVEN PIPE TONGS
Filed Dec. 22, 1945   5 Sheets-Sheet 4
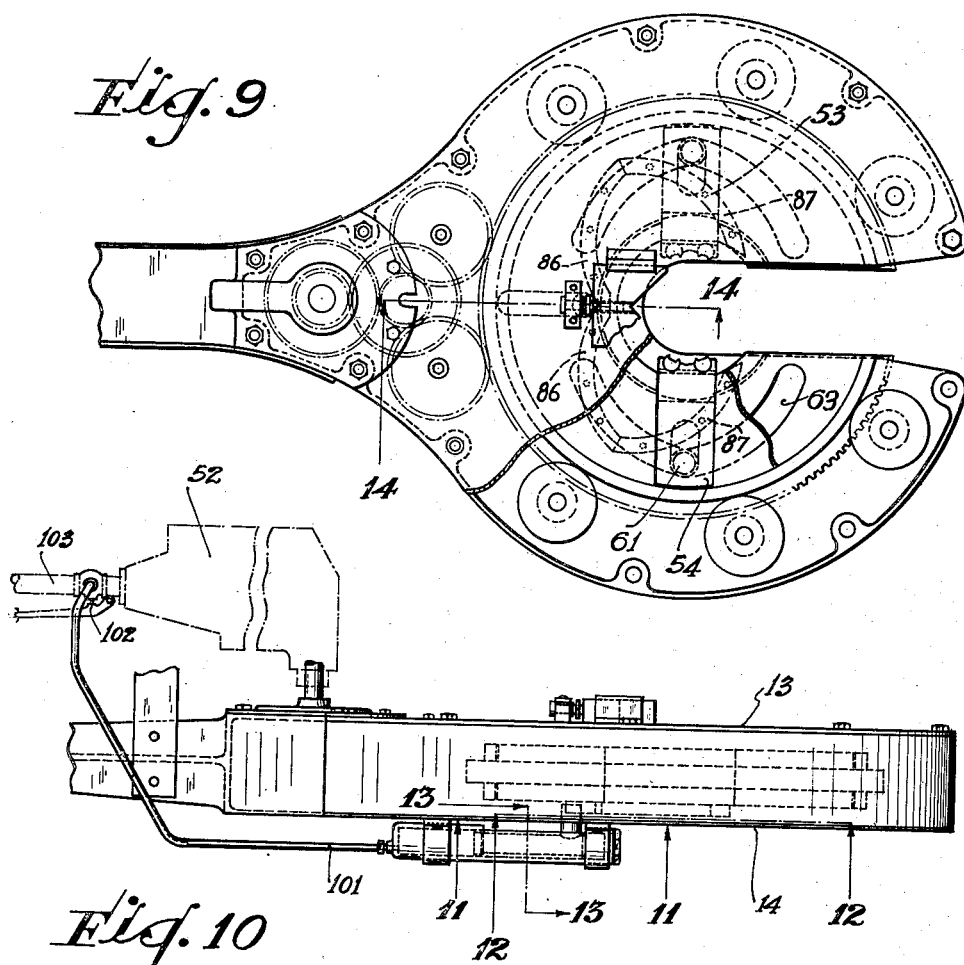
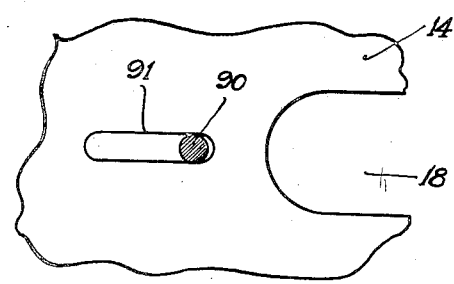
INVENTOR.
JOHN P. DE HETRE.
BY James M. Abbott
ATT'Y.

April 24, 1951  J. P. DE HETRE  2,550,045
POWER-DRIVEN PIPE TONGS
Filed Dec. 22, 1945  5 Sheets-Sheet 5

INVENTOR.
JOHN P. DE HETRE.
BY James M. Abbett
ATTY

Patented Apr. 24, 1951

2,550,045

UNITED STATES PATENT OFFICE 2,550,045

POWER-DRIVEN PIPE TONGS

John P. De Hetre, Compton, Calif.

Application December 22, 1945, Serial No. 637,040

10 Claims. (Cl. 81—57)

This invention relates to pipe handling equipment and particularly pertains to power driven pipe tongs.

When drilling oil wells and when placing them on production considerable time is consumed in the first instance in making and breaking the threaded tool joints of a drill string, and in the second instance in making and breaking the threaded coupling joints of tubing through which production fluid from the well may flow. In connecting threaded pipe joints of the character here described it is necessary to thread the male and female members of the joint together while one of the members is held against rotation and while rotation is imparted to the other member. The common method of rotating one of the pipe members with relation to the other is to grip one member with pipe tongs to hold it against rotation and to then apply a spinning rope to the other member to screw the male member of the joint into the female member, after which the parts are set up tightly so that they will not accidentally unscrew. This procedure requires the services of several men upon the derrick floor and also requires the use of instrumentalities which occupy the derrick floor unnecessarily and may prove to be a hazard during operation. It is desirable, therefore, to provide means for rotating a pipe section, either to make a joint or to break a joint, and which means imparts rotation directly to the rotatable member and by the use of a portable structure. It is also desirable to provide a portable structure in the nature of pipe tongs which may be instantly applied to the element to be rotated and will automatically grip the same incident to the driving action. It is the principal object of the present invention, therefore, to provide a pipe tong structure having a unitary body including pipe embracing means, pipe gripping means, and a power drive for the gripping means, whereby the pipe tongs may be directly applied to a piece of pipe and after which the pipe will be automatically gripped and driven by means directly associated with the gripping means, thus providing a compact unitary gripping and driving structure which is self-contained and is held at all times free of the derrick floor, thereby insuring ease in operation of the structure and eliminating the common hazards incident to the making and breaking of pipe joints.

The present invention contemplates the provision of a rigid body structure carrying a handle at one side by which the structure may be suspended from a suitable support and being formed with a throat at its opposite side to accommodate a drill pipe as the structure is moved to bring the drill pipe to the inner end of the throat and to engage gripping means, said gripping means acting to positively grip the pipe to impart rotation thereto, the structure carrying a power unit for producing said rotation.

The invention is illustrated by way of example in the accompanying drawings in which:

Fig. 1 is a perspective view showing the power tongs with which the present invention is concerned and disclosing the manner in which the unit is suspended for engagement with a pipe.

Fig. 2 is a view in plan with parts broken away showing the details of construction of the self-energizing gripping means and the power drive.

Fig. 3 is a view in vertical section as seen on the line 3—3 of Fig. 2 and discloses driving structure for the head.

Fig. 4 is a fragmentary view in plan showing the operating head.

Fig. 5 is a fragmentary view in vertical section as seen on the line 5—5 of Fig. 4 and shows the manner in which the gear is mounted between the discs.

Fig. 6 is an enlarged transverse section as seen on the line 6—6 of Fig. 4 and shows the manner in which the gripping jaws are mounted upon the gear disc.

Fig. 7 is an enlarged fragmentary view in elevation showing the mounting for the gripping dies upon the jaws.

Fig. 8 is an enlarged fragmentary view as seen on the line 8—8 of Fig. 3 and shows the mounting for the centering block.

Fig. 9 is a fragmentary view in plan with parts broken away showing another form of the invention wherein the gripping jaws are retracted automatically.

Fig. 10 is a view in side elevation showing the structure of Fig. 9.

Fig. 11 is a view in section and inverted plan as seen on the line 11—11 of Fig. 10 and shows the jaw retracting pin.

Figure 12:
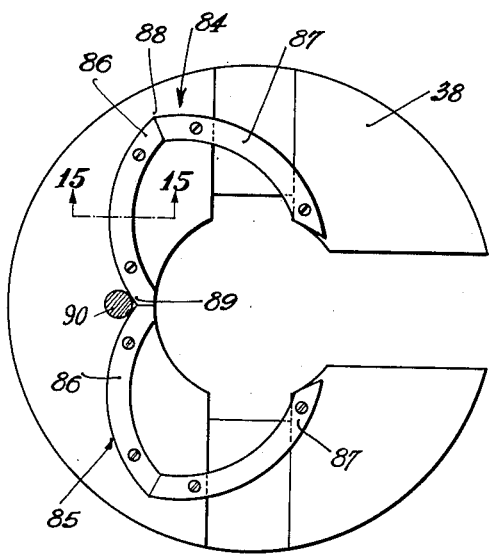
Fig. 12 is a view in section and inverted plan as seen on the line 12—12 of Fig. 10 and shows the formation of a cam disc.
Figure 13:
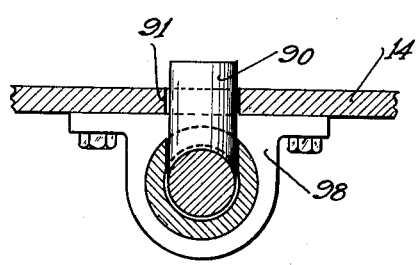
Fig. 13 is an enlarged view in section as seen on the line 13—13 of Fig. 10 and shows the construction of the retracting cylinder.
Figure 14:
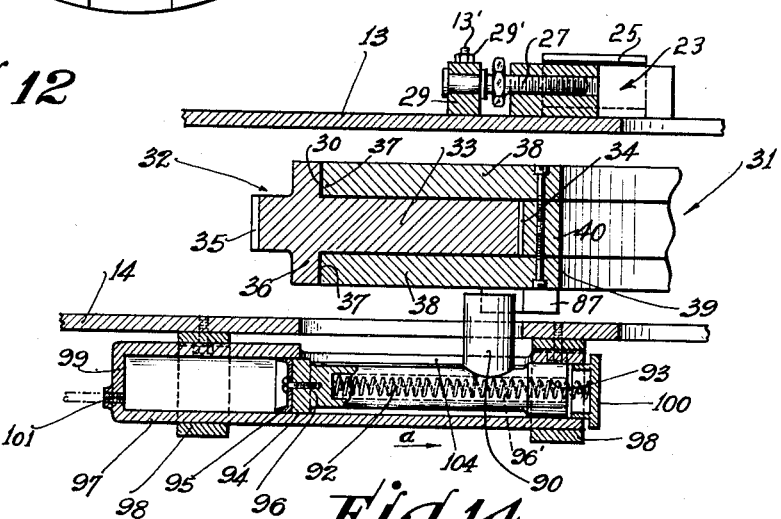
Fig. 14 is an enlarged fragmentary section as seen on the line 14—14 of Fig. 9 and shows the jaw retracting structure.
Figure 15:
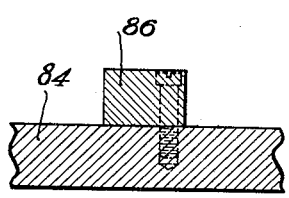
Fig. 15 is an enlarged fragmentary section as seen on the line 15—15 of Fig. 12 and shows the formation of a jaw retracting cam.

Referring more particularly to the drawings, 10 indicates the head of the pipe tongs embodying the present invention and 11 indicates the handle which extends radially from the head and by which the structure is manipulated. The head is substantially circular and is formed with a cast frame 12, to the top and bottom faces of which are secured an upper head plate 13 and a lower head plate 14. As shown in Fig. 2 of the drawings, the frame 12 is substantially circular and continues in a radially extending portion of reduced width carrying the handle 11. The frame 12 is formed with a plurality of bosses 15 and 16 disposed at intervals along its perimeter and extending inwardly to receive bolts 17 which extend through openings in the top and bottom plates 13 and 14 and the bosses of the frame 12 to secure the entire structure in its assembled position and to form a housing within which the operating mechanism of the tongs is mounted. Extending diametrically opposite to the longitudinal axis of the handle is a throat 18 which has an inner semicircular face 19 concentric with the axis of the head and opposite parallel straight faces 20 and 21 which define the opposite sides of the throat 18. At a desired distance from the open end of the throat the side faces flare, as indicated at 20' and 21', to facilitate in guiding a pipe 22 into the throat preparatory to a gripping and rotating action. The throat is formed in the plates 13 and 14, it being understood that the frame 12 terminates at opposite sides of the throat so that the housing formed between the plates 13 and 14 will be open at opposite sides of the throat, for a purpose to be hereinafter disclosed. The width of the throat is designed to accommodate a pipe 22, the diameter of which may be within a desired range, although it is not necessary that it shall be used with only one set of tongs since the tongs are designed to be self-energizing and to grip pipes which vary in diameter over a given range. Disposed upon the top plate 13 at the end of the throat, as defined by the arc 19, is a centering block 23. This block has oppositely inclined faces 24 which are disposed at ninety degrees to each other and lie in vertical planes. The block 23 rests upon the upper face of the plate 13 and is guided between ways 25 which are carried upon the plate 13 and is held by stud bolts 13' and nuts 29'. The block is formed with a central threaded bore 26 which receives an adjusting screw 27. The adjusting screw 27 is formed at its outer end with an extension 28 which is swivelled within a bearing lug 29 carried upon the plate 13. A hexagonal head 30 is formed on the screw at a point between the block 23 and the lug 29 so that the screw may be rotated to adjust the block and dispose its inclined faces 24 in proper relation to the central axis X at the bottom of the throat 18. This insures that a pipe 22 when resting against the faces 24 of the block 23 will be axially centered upon the axis X of the pipe tongs, as indicated in Fig. 2 of the drawings.

Mounted between the plates 13 and 14 of the fixed head structure 10 is a rotatable head 31. This includes a rotor gear 32, shown in Figs. 4 and 6 of the drawings as having a central disc-shaped portion 33 formed with a relatively large central opening 34 through it. At the outer edge of this structure and extending along the circumference thereof is a spur gear 35. Contiguous to the circumferential edge of the rotor 32 are oppositely extending circumferential flanges 36 which form circular recesses 37 at opposite sides of the disc portion 33. These circular recesses accommodate guide discs 38, for a purpose to be hereinafter described. The guide discs 38 have a central circular opening 39 through them which is of smaller diameter than the circular opening 34 in the rotor disc 33. This accommodates spacing blocks 40 which are positioned between the opposing faces of the guide discs 38 and within the opening 34. Screws 41 pass through openings in the guide disc 38 and are threaded into the spacing blocks 40. The structure is so designed as to insure that the surfaces of the guide disc 38 and the rotor 32, which bear against each other, will have a smooth running fit, and will thus permit relative rotational movement of the rotor disc 32 and the guide disc 38, for a purpose to be hereinafter described. As shown in Fig. 2 of the drawing, one side of each guide disc is cut away to form a throat 39' which extends from the opening 39 to the circumferential edges of the discs 38 and continues outwardly through the gear 35. Thus, it will be seen that the gear 35 does not represent a complete circle, but that the throat 18 in the fixed head 10 and the throat 39' in the rotary head 31 when in register will accommodate the pipe 22. The rotary head 31 is mounted in a floating mounting which maintains the rotary head in fixed axial relation to the head 10 but allows it to rotate around this axis when power is imparted to the gear 35 by means to be hereinafter explained. The mounting for the head comprises a plurality of rollers 42 mounted upon shafts 43. These shafts extend through openings in the plates 13 and 14 and rotatably support the rollers with their axes circumferentially arranged around the movable rotor 32. The rollers 42 are made with a reduced spindle section 44 at the opposite sides of which are enlarged flanges 45. The space between the opposing faces of the flanges 45, as represented by the length of the spindle 44, agrees with the width of the gear 35 so that the gear will extend between the flanges 45. The diameters of the flanges 45 are such as to engage the outer circumferential faces of the annular flanges 36 upon the rotor disc 33. Thus, it will be seen that the rotor head 31 will be free to rotate around the axis X. It is also to be understood that when the rollers 42 are mounted upon the shafts 43 they may be equipped with anti-friction bearings to eliminate wear and insure that the rotary head 31 will move freely.

The rotary head 31 is driven by pinions 46 which are spaced equidistant from each other at opposite sides of the longitudinal center through the head 10. These pinions are mounted upon shafts 47 which support the pinions so that they may engage the gear 35 simultaneously and drive it. The pinions 46 in turn are driven by a drive pinion 48 with which they both mesh. This pinion is mounted upon a shaft 49 and carries a gear 50 in mesh with a main drive pinion 51 which receives its driving force from a motor generally indicated at 52. The motor may utilize electricity or fluid under pressure and is reversible. The head may be driven at two different speeds as will be hereinafter explained.

The rotary head 31 carries a pair of cam actuated jaw units 53 and 54. These jaw units move radially with relation to the axis X. As shown in Figs. 2, 4 and 6 of the drawings, the jaw units have a central portion 55 which extends parallel to the axis X. Formed integral with this central portion are parallel arms 56 which lie in radial slots 57 formed in the opposite outer faces of the discs 38. Thus, the jaw units straddle portions of the discs 38, as well as the movable disc 33 carrying the gear 35. The inner portions 55 of the cam actuated jaw units are formed with arcuate seats 58, each of which represents more than 180 degrees of a circle (see Fig. 7). In each of these sets a gripping die 59 is mounted for rotation. These dies have gripping teeth 60 which will lie against the outer circumference of pipe 22 while extending longitudinally thereof, and will impinge against the surface of the pipe to produce a positive gripping action. It will be understood that the dies 59 are free to rotate upon their longitudinal axes so that they will be self-aligning with the circumferential face of the pipe 22 when in their gripping positions.

The cam actuated jaws 53 and 54 are designed to move toward and from a gripping position as an operation incident to the rotation of the moving head 31. In order to accomplish this each of the jaw units is fitted with a pin 61 which extends downwardly through slotted openings 62 in the plates 38 of the units and also through an eccentric cam slot 63 formed through the movable disc portion 33. The eccentric cam slot is formed symmetrically from a center line on a curve of progressively shortened radii toward its opposite ends and with relation to the axis X. Thus, when the discs 38 are held against rotation, as will be hereinafter described, and the disc 33 is driven, each pin 61 will be traversed by one of the cam slots 63 and will be correspondingly moved toward and away from the axis X. When the dies 59 engage the surface of the pipe 22 until inward movement of the cam actuated jaws 53 and 54 is prevented the pipe will be gripped and further rotation of the gear 35 and the movable rotor unit 32 will cause rotation of the pipe. In order to prevent unnecessary wear the pin 61 is equipped with roller bushings 64 which engage the walls of the cam slot 63.

In order to temporarily grip the discs 38 so that relative movement will occur between the discs 38 and the disc 33 a brake shoe 65 is provided (see Fig. 3). This shoe comprises a drag plate 66 and a lining 67. The lining will bear against the under face of the lowermost disc 38. The shoe is secured by a cap screw 68 to a plunger 69 of an air cylinder 70. A suitable spring 71 is mounted within the air cylinder to retract the plunger 69 when air pressure is relieved. An air conduit 72 connects with the cylinder 70 and may be controlled by a suitable valve 73.

The entire structure is preferably supported from a cable 74 which carries a supporting and balancing arm 75. This arm is formed at one end with a hook 76 which engages an eye 77 on the end of the handle 11. The arm 75 receives a turnbuckle 78 which is connected to a shackle 79. The shackle 79 engages an eye-bolt 80.

In the form of the invention shown in Figs. 1 to 8 of the drawing, it will be obvious that the cam actuated jaws 53 and 54 will not return automatically to a retracted position so that the pipe can be released or gripped. It is desirable, therefore, to provide means for retracting the jaws as operated by a simple control member.

A structure in which the means provided to retract the jaws is shown in Figs. 9 to 15 of the drawing. Here it will be seen that the guide discs 38 are constructed as previously described with cam slots 62 to receive the cam pins 61.

The under face of the guide disc 38 is formed with a pair of surface cams 84 and 85. Each of these cams is formed from a pair of arcuate cam rails 86 and 87 which combine to provide a cam track representing one end of an elliptical-shaped or triangular-shaped figure. Contiguous ends of the portions 86 join on the normal medial line of the tongs and in the center plane of the jaw openings. The ends of the rails 86 abut against each other and terminate at the edge of the central opening 39 through the lower disc 38. The opposite rails 87 on the cam are mounted upon the lower disc 38 and provide arcuate surfaces which are spaced from and diverge from the axis of the rotating head 31. The rails 87 are disposed with their curvature opposite to that of the curvature of the rail portions 86. Thus the surface cams 84 and 85 each provide a swell which terminates at an apex point 88 formed by complementary rails 86 and 87 and a dwell 89 formed at the juncture of complementary rails 86.

The outer contours of the cams 84 and 85 are designed to be engaged by a pressure pin 90 which extends through a longitudinally disposed slot 91 in the plate 14 of the housing. The pressure pin 90 is carried upon the plunger rod 92 and is disposed radially thereof adjacent to one of its ends. The plunger rod 92 is spool-shaped having an enlarged guide end 93 and an enlarged piston end 94. A packing cup 95 is mounted upon the piston end and is held by a screw 96. The plunger thus formed is mounted to reciprocate within a cylinder 97. The cylinder lies parallel to the slotted opening 91 in the bottom wall 14 and is held in position by bracket fittings 98. A closed-in wall 99 occurs at one end of the cylinder and a removal plug 100 occurs at the opposite end. The wall 99 receives the end of a fluid supply line 101 which leads to a valve 102 on the supply line 103 connecting with the air motor 52 by which the tongs are actuated. Thus when the valve 102 is open, fluid under pressure will be delivered into the closed portion of the cylinder 97 which occurs between the end wall 99 and the packing cup 95. This will tend to force the plunger 92 in the direction of the arrow $a$ as indicated in Fig. 12.

It is to be understood that the side wall of the cylinder 97 is formed with a slot 104 to accommodate the pressure pin 90 and to permit the plunger 92 to reciprocate. By the arrangement of the structure shown in Figs. 9 to 15 inclusive, it is possible to produce a drag on the guide discs 38 to cause relative movement between said discs and the gear disc 33 as the jaws are set and by supplying fluid pressure to the cylinder 97, it is possible to restore the guide disc 38 and the jaws 53 and 54 to their original positions.

In view of the fact that it may be desirable to retract the jaws 53 and 54 at high speed and to apply a heavy slow speed force in setting the jaws and rotating the pipe, a variable speed transmission is shown in Figs. 2 and 3 of the drawing. Here it will be seen that the air motor 52 drives the shaft 105 upon which a gear 106 is mounted for free rotation. This gear drives the gear 48 on shaft 49 by engaging a lower portion 107 thereof. The gear 106 is formed with a jaw clutch 108. The gear 51 is splined upon the shaft 105 and carries a clutch jaw 109 which can be moved into engagement with the clutch jaw 108, and out of driving engagement with the gear 50.

This action is performed by a shift fork 110, the free end of which engages a collar 111 on the gear 51. The fork is carried on a rod 112 mounted to reciprocate within the pipe tongs housing structure. The rod is fitted with a fork 113 at its upper end to receive a finger 114 carried upon a shaft 115. The shaft is mounted rotatably in bearing 116 and may be operated by a shifting lever 117.

In operation of the present invention as shown in Figs. 1 to 8 inclusive, the tongs are assembled as shown in the drawings and are suspended by suitable means associated with an oil well derrick, such for example as the cable 74 and the members 75 and 76. For convenience the cable may be led over a pulley and connected to a counterweight. By the supporting arrangement here shown the tongs will be maintained in a horizontal position to be swung over a derrick floor and over the top of a rotary table. When it is desired to grip a pipe with the tongs the pipe will be extending through the rotary table and will be axially aligned with the axis indicated at X in Fig. 2 of the drawings. The tongs are then placed with the pipe in the entrance of the throat 18, after which the tongs are swung to a position where the pipe will rest against the faces 24 of the centering block 23. It will be understood that the block has been adjusted by the screw 27 so that is faces 24 will lie against the outer circumference of the pipe 22 when the axis of the pipe and the axis X of the tongs are coincident. Air pressure is then applied to the cylinder 70 by opening the valve 72. This will force the brake shoe 65 upwardly so that its surface 67 will engage the under surface of the lowermost disc 38. This disc forms a part of the movable head section 31. Power is then delivered to the driving motor and will be imparted to the gear 35 through the train of gears 46, 47, 48, 51 and 52. As the gear 35 is rotated the head 31 will tend to rotate as a unit, but since the discs 38 are held against rotation by the brake shoe 65 the gear 35 and its disc 33 will rotate with relation to the discs 38. The result will be that the cam actuated jaws 53 and 54 will be forced inwardly as the pins 61 are traversed by the arcuate cam grooves 63. This action will continue to take place until the dies 59 strike the surface of the pipe 22 and are prevented from moving inwardly any further. Then the gear 35 and its disc 33 will move in unison with the discs 38 and thus the entire rotary head 32 will revolve around the axis X as supported by the rollers 42. This rotation will continue until the pipe joint is properly tightened or unscrewed.

When the form of invention shown in Figs. 9 to 15 is used and power is applied to drive the motor 52, it is of course necessary to tend to hold the guide plates 38 against rotation so that the gear disc 33 will move relatively thereto and shift the gripping jaws 53 and 54 inwardly. This action has been described in connection with the structure shown in Fig. 3 as being accomplished by the friction brake 65.

In the second form of the invention, however, the pressure pin 90 is initially seated in the dwell 89 formed by the cam structures 84 and 85. Any tendency to rotate the discs 38 will be resisted by air pressure within the cylinder 87 as the cam rails 86 tend to force the pressure pin outwardly.

After a pipe has been rotated due to the power driving action of the tongs, it is desirable to release the tongs from the gripping action of the jaws. This is accomplished by controlling driving motor 52 to cause it to drive in a reverse direction with the result that the rotatable head 31 may be driven to bring the throat of the head in alignment to the throat 18 of the housing. It is then necessary to insure that the guide discs 38 shall be restored to their initial positions and the jaw units 53 and 54 shall be restored to their full retracted positions. In order to accomplish this the fluid valve 102 is open to allow air under pressure to pass through the pipe 101 and into the cylinder 97. This will force the plunger in the direction of the arrow a as shown in Fig. 12. As a result, the pressure pin 90 will force against the arcuate faces of the cam members 84 and 85 and tend to rotate the discs 38 to restore them to their original positions. This will be accompanied by retraction of the jaw members 53 and 54. It will be understood that a spring 96′ acts normally to hold the pin 90 yieldably against the surfaces of the cams 84 and 85.

It will be noted that due to the manner in which the assembled tongs are carried upon a swinging support and the manner in which the throat of the tongs is designed the tongs may be rapidly swung to and from their operative positions, thus making it possible to quickly spin the pipe as desired.

It will thus be seen that the invention here disclosed embodies power pipe tongs which are self-contained and power energized so that they may be rapidly applied to a pipe to be rotated, and will automatically grip the pipe incident to the rotating action.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. Power tongs comprising a substantially circular housing structure formed with a central opening therethrough and a radial throat leading therefrom to the circumference of the housing, said housing comprising top and bottom plates and an intermediate wall along their perimeters, an extension formed at one side of the housing and in alignment with the radial throat, a rotary head enclosed within the housing and having a central opening in axial alignment with the central opening in the housing and a radially extending throat leading therefrom and which may be brought to register with the throat in the housing, said rotary head including a mutilated gear having a central opening therethrough and a radial throat leading therefrom, a pair of guide discs, one mounted on each side of said gear and intermeshing therewith so that the discs and the gear might have relative movement around a common axis, means tying the two discs together whereby they may move in unison, supporting means for the rotary head permitting bodily rotation of the head around its axis while limiting it against axial movement, a pair of jaws mounted upon said discs for movement radially of the axis of the rotary head, means whereby relative rotation between the gear and the discs will produce said radial movement, power means for driving the gear on the rotary head, and optionally controlled means acting upon said discs for temporarily holding said discs against rotation with relation to the gear whereby the jaws will be moved as the head is rotated.

2. The structure of claim 1 including means carried by said housing for centering a pipe upon the central axis of the rotary head preliminary to a gripping and rotary action of the head.

3. The structure of claim 1 including adjustable centering means for disposing the axis of a pipe to be gripped and the axis of the rotary head in coincidence.

4. Pipe tongs comprising a substantially circular head housing having a central opening therethrough and a radially extending throat leading from said central opening to the circumference of the housing, said housing being formed with upper and lower walls and an intermediate spacing wall around the perimeter thereof, a handle extension upon the opposite side of the housing from its radial throat and by which the structure may be manipulated, a rotary head enclosed within said housing, said head being formed with a gear upon the opposite sides of which are disposed separate guide plates connected to move in unison with relation to the gear and around the axis thereof, the gear and plates having a central pipe opening therethrough and radially extending passageways therefrom forming a throat adapted to register with the throat in the housing and accommodate a pipe, a plurality of rollers circumferentially spaced within the housing and adapted to rotatably support the rotary head and center it, a driving pinion carried within the housing and in mesh with the gear forming part of the rotary head, power means carried by the housing, a driving connection between the power means and said pinion, a plurality of jaws mounted for radial movement upon and straddling the guide plates, cam faces on the gear, cam engaging means on the jaws, and optionally controlled means for temporarily holding the guide plates as the gear is driven whereby the jaws may be set against the pipe to be gripped prior to rotation in unison of the gear and the guide plates around their common axis.

5. A pipe tong structure comprising a substantially circular housing having a central opening therethrough from which a radial throat extends to the circumference of said housing, a rotary head mounted within the housing and lying in a plane parallel thereto, said rotary head having a central opening through it in axial alignment with the central opening in the housing and having a radial throat extending from said opening to the circumference of the head whereby when the two throats are aligned a pipe may be straddled and moved to a position in axial alignment with the central opening, means mounted within the housing for allowing free rotation of the rotatable head around the central axis thereof, said rotary head comprising a central disc having gear teeth along the circumferential portion thereof and upon the opposite sides of which disc are guide discs mounted with relation thereto whereby the guide discs may have relative rotational movement to the gear disc and movement in unison with the gear disc around the central axis thereof, a pinion rotatably supported in the housing and meshing with the gear teeth on the central disc to drive the same, eccentric cam slots formed through the central disc, cam pins extending through said slots and connecting the discs whereby relative rotational movement of the gear discs and the guide discs will cause the cam pins to move radially of the rotary head, and gripping jaws, each straddling the discs and having a portion carrying a gripping face and extending into the central opening of the rotary head, guide means on the guide discs for directing said gripping jaws along a radial path of travel with relation to the axis of the rotary head, said gripping jaws being engaged by the pins extending through the cam slots whereby the jaws will move in unison with the pins as the gear disc and the guide discs have relative rotation.

6. The structure of claim 5 including a brake adapted to be temporarily set to hold the guide discs against rotation as the gear disc moves whereby radial movement of the jaw structures will be initiated.

7. Power pipe tongs comprising a relatively fixed head structure having a central opening therethrough and a throat extending radially therefrom to accommodate a pipe, a rotatable head housed within the fixed head and having a central opening therethrough and a throat extending radially therefrom to accommodate a pipe, whereby a pipe may pass through the radial slots to the central openings when said radial throats are aligned, power means for rotating the rotatable head with relation to the fixed head, jaws radially disposed upon the rotatable head and adapted to move toward and away from the pipe, jaw actuating means operating incident to the rotation of the rotatable head whereby the jaws may be simultaneously moved toward and away from the central axis of the head, and controllable means separate from said jaw actuating means for retracting said jaws when it is desired to release a pipe which has been gripped.

8. Power pipe tongs comprising a relatively fixed head housing having a throat opening extending radially from the center of the head to accommodate a pipe at the center of the head, a rotatable head mounted within the relatively fixed head structure and rotating in a plane normal to the axis of a pipe to be gripped, said head being formed with a pipe receiving throat adapted to register with the throat in the head housing when in their normal positions, power means for driving the rotatable head around its central axis, gripping jaws moving radially within the housing, optionally controlled interengaging means between the gripping jaws and the rotatable head for simultaneosuly moving said jaws toward and away from a gripping position, and an optionally controlled means carried by the head housing and cooperating with the rotatable head to restore the rotatable head to its normal position and thereby to retract the gripping jaws.

9. In a device of the character described, including a housing, a disc-like rotatable head mounted within the housing in a plane normal to the central axis of the housing and for rotation around said central axis, power driving means for rotating said head, a cam follower carried by the housing, cam surfaces carried by the rotating head and being engageable by said follower, said surfaces forming an intermediate "dwell" point and oppositely extending symmetrical "swells" whereby when the follower is in the "dwell" position the rotating head will be set normally, yieldable means associated with the cam follower tending to resist displacement of the follower by rotation of the head and pressure exerting means acting optionally to force the cam follower to its original "dwell" position and thereby rotate and restoring the head to its normal center position.

10. Power tongs comprising a housing structure formed with a central opening therethrough from which a radial throat extends to the circumference of the housing, a rotary head mounted to rotate upon the axis of said central opening and in a plane normal thereto, said rotary head having a central opening through it in axial alignment with the central opening in the housing and having a radial throat extending from said opening to the circumference of the head, whereby when the two throats are aligned a pipe may be straddled and moved to a position in axial alignment with the central opening, bearing means within the housing for supporting the rotary head for free rotation around the axis thereof, said head comprising a gear disc having gear teeth along the circumferential edge thereof, a guide disc parallel thereto and rotatable around the axis of the head, gripping jaws mounted upon said guide disc for radial movement, cooperating means between the gear disc and the gripping jaws whereby relative rotation between the gear disc and the guide disc will produce radial movement of the gripping jaws, power drive means for the gear disc, friction means applied to the guide disc whereby the guide disc will be retarded in its rotation as the gripping jaws are moved positively to a gripping position, cam means associated with said guide disc, a cam follower carried by said housing structure and yieldably engaging said cam means and tending to hold the gear disc and the guide disc with their throats in register, and positively controlled pressure means acting upon the follower to restore the throats of said discs to register when driving operation of the head has been interrupted.

JOHN P. DE HETRE.

REFERENCES CITED

The following references are of record in the file of this patent:

UNITED STATES PATENTS

| Number | Name | Date |
|---|---|---|
| 981,724 | Vold | Jan. 17, 1911 |
| 1,200,612 | Helm | Oct. 10, 1916 |
| 1,955,727 | Adams | Apr. 24, 1934 |
| 2,000,221 | Dawson | May 7, 1935 |
| 2,181,641 | Hicks | Nov. 28, 1939 |
| 2,305,624 | Lange et al. | Dec. 22, 1942 |
| 2,317,306 | Smith | Apr. 20, 1943 |